Sept. 19, 1967   W. L. BERLINGHOF, JR   3,342,667
DRY FLUOROCARBON BEARING MATERIAL
Filed Aug. 23, 1963
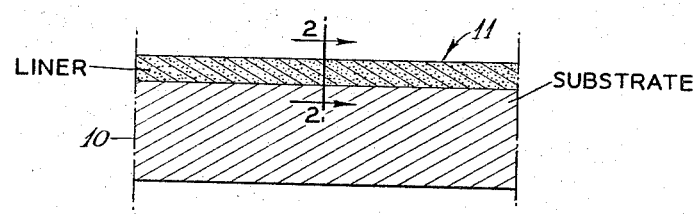
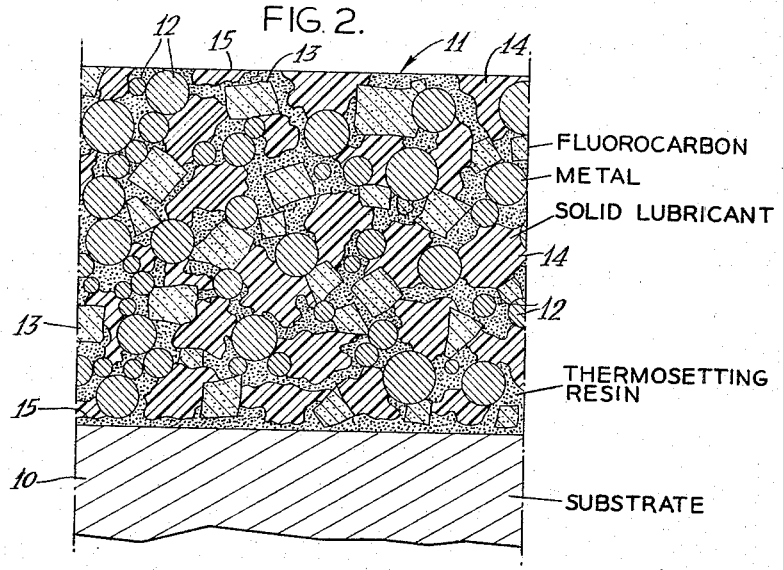
INVENTOR:
WILLIAM L. BERLINGHOF, JR.
BY Howson & Howson
ATTYS.

United States Patent Office 3,342,667
Patented Sept. 19, 1967

3,342,667
DRY FLUOROCARBON BEARING MATERIAL
William L. Berlinghof, Jr., Abington, Pa., assignor to Woodmont Products, Inc., Huntingdon Valley, Pa., a corporation of Pennsylvania
Filed Aug. 23, 1963, Ser. No. 304,170
5 Claims. (Cl. 161—186)

This invention relates to dry bearings and to a method of producing them and has for an object the provision of improvements in this art.

More particularly, the invention relates to plain bearings, as distinguished from ball bearings, but includes various kinds of sliding surfaces in addition to devices having rotary or turnable surfaces which are generally referred to specifically as bearings.

One of the particular objects of the invention is to provide an improved bearing material capable of operating without or with an external lubricant but does not include porous material which holds an oozing liquid lubricant.

Another object is to provide a bearing material which is self-adherent or which can readily be bonded to a metallic or non-metallic substrate (i.e., cementable) whereby to combine the heat-transfer and/or strength characteristics of the substrate with the low-friction and long-wear characteristics of the bearing material.

Another object is to provide a bearing material which is capable of being molded into useful shapes, either alone or on substrates, as by cold-pressing techniques with or without subsequent heating.

Another object is to provide a bearing material which incorporates a polymerized fluorocarbon but in such a condition that it does not flow under load pressures like materials which contains a considerable thickness of a fluorocarbon.

Another object is to provide a bearing material having high heat conductivity while retaining the low-friction characteristics of fluorocarbon.

Another object is to provide a bearing material which incorporates metallic particles of high mechanical strength and high heat conductivity which are rigidly bonded together without metallic sintering and the forced introduction of a fluorocarbon under pressure, as has been practiced heretofore.

Another object is to provide a bearing material with good lubricity characteristics by the incorporation of a solid lubricant such as molybdenum disulphide, graphite, or the like, together with a fluorocarbon which provides accentuated low-friction and the ability to coat the associated sliding part with a thin film of the low-friction material.

Since its introduction (see Patent 2,230,654 Plunkett, 1941), it has been known that polytetrafluoroethylene (P.T.F.E.), known best by its trade name "Teflon," has a very low coefficient of friction, the lowest of any solid material, and ways have continuously been sought to employ it in bearings.

P.T.F.E. or "Teflon" is one form of polymerized fluorocarbons. There are others with similar properties which can be used, "Kel-F," a fluoro-chloro carbon, being the next best known.

Polymerized fluorocarbons have been incorporated with fibers such as textile fibers, glass fibers, asbestos fibers, and the like in a hardenable resin, such as a phenolic condensation product; but such bearing materials have low heat conductivity and a relatively high rate of wear.

Polymerized fluorocarbons have been incorporated in sintered powdered metal matrices, as by being forced into the porous sintered structure under pressure or vacuum or both; but the penetration is seemingly difficult and non-uniform and it is impossible to obtain a homogeneous body of material in this way. If a polymerized fluorocarbon is mixed with the metal powder before sintering, at least with powders of metals such as copper, bronze, silver, and the like which are useful and desirable as bearing components, it is usually completely destroyed at the high sintering temperatures required. Silver can to some extent be sintered at a temperature low enough to avoid too much damage to the fluorocarbon, which itself sinters at a relatively high temperature, but even here the results are not good when other metals with higher sintering temperatures are involved, as is preferred for most bearings.

If the fluorocarbon is not uniformly incorporated in the bearing material it is impractical to machine the bearing after alignment or otherwise handle the material as a thick uniform bearing material; and obviously the sintered metal cannot be remolded into useful shapes.

As a guiding principle for preparing bearing materials which use fluorocarbons, there must be no considerable separate thickness of the fluorocarbon in any part of the material because fluorocarbons are low in strength, creep under pressure, have a low wear rate, have a high coefficient of temperature expansion, and in other respects alone, lack qualities needed for bearing materials.

According to the present invention a thermosetting resin material is used as a binder to create a strong metal-to-metal bond without requiring a metal-sintering temperature, and capable of holding within the metal-plastic matrix a combination of desirable low-friction materials including a polymerized presintered fluorocarbon, and a solid lubricant such as molybdenum disulphide ($MOS_2$), graphite, or the like.

The preferred range of such thermosetting plastic resin material is from about 21% to about 39% by volume. Below about 25% the strength begins to decrease with increase in wear rate due to lessened particle binding; and above about 35% the wear rate increases, apparently due to the greater relative amount of the non-lubricant binder.

The presently preferred class of thermosetting resins are epoxies, preferably liquid epoxies, cured either by an anhydride, a polyamide, or an amine cross-linking system. Liquid polyester resins have also been found suitable, and from studies which have been made up to the present time it appears that other thermosetting liquid resins can be used.

An understanding of the objects, features and advantages of the invention will be apparent from the following description of an examplary embodiment, reference being made to the accompanying drawings, wherein:

FIG. 1 is a section through a part of a bearing liner carried on a substrate, embodying the present invention;

FIG. 2 is an enlarged section taken on the line 2—2 of FIG. 1;

The bearing unit shown in the drawings comprises a supporting substrate 10, as of steel, and a line 11 adapted to operate against the surface of a mating member (not shown), such as a steel shaft or the like.

The line 11, as shown in FIG. 2, comprises heat conductive particles 12, preferably spherical, of copper, bronze, silver or other hard heat conductive metals, or mixtures of these metals, fluorocarbon material 13 dispersed uniformly therethrough in thin sections, a solid lubricant material 14 with good smearing characteristics, such as graphite or molybdenum disulphide $MOS_2$, and a rigid plastic resin bonding material 15 of good adhesive characteristics such as phenolics, epoxies, polyesters and the like, preferably epoxies.

BONDING RESIN

The plastic resins which may be used advantageously are preferably thermosetting resins which may be converted with or without heat into a form which is rigid and no longer fusible at high temperatures and which is no longer soluble in ordinary solvents. There is a wide variety of thermosetting resins available, some examples of such materials being phenol aldehyde resins, particularly the phenol formaldehyde resins; the resorcinol aldehyde resins, particularly the resorcinol formaldehyde resins; the urea aldehyde resins, particularly the urea formaldehyde resins; the melamine formaldehyde resins; the furfuryl alcohol-furfuraldehyde resins; the alkyd resins, such as the phthalic alkyds and the non-benzenoid alkyds; the epoxy resins, such as those obtained by condensing epichlorohydrin with phenols and glycols; the silicone resins, such as those prepared by treatment of Grignard reagents with silicon tetrachloride and then hydrolyzing and condensing the resulting silicon chlorides; the polyester resins, such as those manufactured by reacting unsaturated acids such as furmaric and maleic acid and their anhydrides with polyalcohols; and others.

METALS

The preferred heat conductivity metals are copper and bronzes and, for some bearings, silver.

Clean spherical bronze particles in the range of about 0.0001″ to about 0.004″ diameter are preferred. A mixture of bronze and copper spheres (in the size range given) has been found to cause less frictional heat and to show less wear than bronze alone. Mixtures of bronze to copper of 1 to 3 by volume have been found to give good results but this range is not sharply critical. Bronze is harder than copper and when a bearing contains bronze particles and is properly broken in—that is, worn to a point where the bronze spheres have flat-worn faces and are smeared with fluorocarbon or a brownish-green product of the fluorocarbon and metal—it appears to provide a more wear-resistant "support" for a rotating steel shaft than a similar bearing containing all copper particles. Irregular shaped metal particles (i.e., dendritic copper, and the like) give slightly higher strength but are not as good in wear rate as spherical particles.

The addition of small amounts of finely powdered lead, from 0% to 20% of the total metal volume, may be beneficial.

When pure silver particles are used in place of copper or bronze or both, an electrically conductive bearing material of good heat conductivity with exceptionally low resistivity is obtained. This has usefulness as a current-collecting or brush contact material where a low wear rate is important.

The total metal content for best overall wear results is between about 18% and 52% of the final bearing volume.

SOLID LUBRICANT

For less frictional heat and wear it has been found desirable to add substantial quantities of a finely divided solid lubricant, such as graphite, molybdenum disulphide, or other known solids with low-friction characteristics.

The preferred range of such solid lubricant is from about 12% to about 32% of the final bearing volume, the preferred material being molybdenum disulphide of particle size below 100 microns.

FLUOROCARBON

The fluorocarbon which has given best results is PTFE in sintered and powdered form. This is added in amounts by volume of from about 14% to about 32%. The PTFE smears over the metal particles of the bearing surface and into the pores of the steel shaft or moving part to create a thin greenish or brownish-gray layer after a break-in period of from 1 to 60 hours, the time depending on speed, load and other factors.

PTFE is available in various forms, the best known being "Teflon" TFE (Du Pont Co.). Other forms, such as lower molecular weight material, such as "FEP" or "Vydax" (Du Pont Co.) or chlorine-containing fluorocarbons, such as chlorotrifluoroethylene or "Kel-F," also give good results.

PROCEDURE

The solid components of the bearing material, metal particles, solid lubricant powder and sintered fluorocarbon (PTFE) powder, are thoroughly mixed and liquid binding resin stirred in to form a slightly sticky dry powder which can be fed, as by vibration, or, in pellet form, by pouring into a mold and which will cohere when pressed into various shapes. The material is deposited in a mold and cold-pressed at from 10 to 10,000 p.s.i. It may be left in the mold for curing or removed immediately and post-cured with little change in dimensions.

The lubricity of the green uncured molded shape makes for easy removal from molds without damaging the weakly knit shapes, especially when using cylindrical molds for forming rotary shaft bearing liners. Higher pressures give better strength and wear properties; and the cured material has less voids than when made with lower pressures. A preferred range of pressure is from about 1000 p.s.i. to 5000 p.s.i. and at these pressures the resulting void volume ranges from about 1% to 8%.

The material may be molded against clean metal, wood and various substrates, the contact surface of the substrate preferably being pre-roughened, as by striation, scoring, drilling, sandblasting and the like, to improve the bond. The material-binding resin forms a strong bond with the substrate, making possible the use of thin-walled strong bearing assemblies. If not cured against a substrate, the binding material used is of such a nature as to make subsequent adhesive bonding (cementability) easy. Fluorocarbons alone are not readily cementable.

No dwell time is required for such cold-molding and it is possible to cure certain bearing mixtures without subsequent heat. Substantial economies in processing are made possible by such rapid cold-pressing.

It is also practicable and economical to fill tubes under pressure with the powder to form long cylindrical bearing blanks. After curing, the blanks can be bored and finished to form the bearings. Since the body of material is homogeneous, all cut surfaces will be alike.

Example 1

Ten (10) parts by weight of a liquid epoxy (condensation product of epichlorydrin and bisphenol A, for example, Shell Chemical Co. "Epon 820") was mixed with (9) parts of methyl anyhydride such as the product sold by Allied Chemical Corporation under the trade name "Nadic Methyl Anhydride" and one-tenth (0.1) part of benzyldimethylamine. This was stirred into ninety (90) parts by weight of sperical copper (N.J. Zinc Co. #1002) and thirty (30) parts by weight of spherical bronze (11% tin, Metals Disintegrating Company MD 40 P grade) which measured from 0.0001″ to 0.003″ diameter. To this was added eighteen (18) parts by weight of 100-mesh powdered lead. Then fifty-five (55) parts by weight of molybdenum disulphide (Climax Molybdenum Co., technical grade) was stirred in. Finally, twenty-five (25) parts by weight of sintered ground PTFE (average particle size 5 microns) was stirred in vigorously for five (5) minutes by a high-speed propeller.

The slightly sticky dry material thus produced was fed into a cylindrical mold and pressed at two thousand (2000) p.s.i. for two (2) seconds at room temperature, then ejected from the mold and cured in an oven for one (1) hour at 220° F., then for one (1) hour at 320° F., and then for two (2) hours at 420° F.

P.T.F.E. sinters at about 750° F. so there will be little resintering of the P.T.F.E. content at the temperatures used to cure the thermosetting resin.

The material thus made, when tested, exhibited an exceptionally low wear rate when run as a sleeve bearing at pressures up to 1500 p.s.i. and peripheral speeds up to 800 feet per minute.

Example 2

The lead of Example 1 was replaced with an equal volume of bronze and copper spheres in the 1 to 3 ratio, all other components and procedures remaining the same.

The material had excellent wear rates at medium-high speeds (100 to 500 feet per minute) but somewhat lower wear rates at low speeds (12 feet per minute).

Example 3

The resin binder (epoxy) of Example 2 was replaced by an equal rate of triallyl cyanurate-based polyester resin (American Cyanamide Co., "Laminac 4232"). The material gave good wear rates at low to medium speeds and loads (10 to 100 feet per minute and 10 to 100 p.s.i.).

Example 4

All of the copper of Example 2 was replaced by an equal volume of pure silver powder (Handy & Harman, 3 M). The material performed well in unlubricated sleeve bearings and had a specific resistivity of less than 0.01 ohm-cms.

Example 5

Half of the copper of Example 2 was replaced by an equal weight of pure dead-soft copper wire of 0.002" diameter and in lengths of 1/16" and 1/8". The material had increased impact and flexural strength and was less frangible than the material of Example 2.

Example 6

The mixture of Example 1 was pressed against a clean steel substrate at 20 p.s.i. The material had a good bond to the steel and performed well as unlubricated sleeve bearings at low to medium speeds and loads.

Example 7

The molybdenum disulphide of Example 1 was replaced by an equal volume of powdered graphite (Dixon Co., 200-09). The material had excellent wear rates at low to medium speeds and loads.

Example 8

Fourteen (14) parts by weight of a liquid epoxy (condensation product of epichlorydrin and bisphenol A, for example, Shell Chemical Co. "Epon 820") was mixed with five (5) parts by weight of polyamide resin (General Mills Versamid 140). This was stirred into one-hundred (100) parts by weight of spherical copper particles (N.J. Zinc Co. #1002) and fifty (50) parts by weight of spherical bronze particles (11% tin, Metals Disintegrating Company MD 40 P grade) which measured from 0.0001" o 0.003" diameter. To this was added forty-five (45) parts by weight of molybdenum disulphide (Climax Molybdenum Co., technical grade). Finally, twenty-five (25) parts by weight of sintered P.T.F.E. (average particle size 5 microns) was stirred in vigorously for five (5) minutes by a high-speed propeller.

The slightly sticky dry material thus produced was fed into a cylindrical mold and pressed at two thousand (2000) p.s.i. for two (2) seconds at room temperature, then ejected from the mold and cured at room temperature.

The material had excellent bearing characteristics.

Example 9

The material of Example 8 was pressed against a clean metal substrate at 20 p.s.i. and cured. It had excellent adhesion to the substrate and performed well as a bearing.

An advantage in using powdered fluorocarbon in sintered form instead of the unsintered form, such as a water dispersion which is commonly used, is that the sintered material does not tend to separate the metal particles in the dry mixture, hence there is better metal-to-metal contact in the final material with better heat and electrical conductivity.

Another advantage is that sintered fluorocarbon has less flow and wear under pressure in use than unsintered material, yet has enough flow under pressure to provide the desired coating of the relatively moving surfaces.

Another advantage is that it does not require high temperatures since it does not need to be sintered, allowing the lower temperatures of the thermosetting resin to be used.

Another advantage is that it does not agglomerate under stirring or light-localized pressure as does unsintered fluorocarbons.

For tabular reference the composition range found best up to the present time is as follows:

Metal:
    18% to 52% by volume of copper, bronze or powdered silver.
    Size bronze or copper, 0.0001" to 0.004".
    Lead, 0–20% of total metal.
Solid lubricant: Graphite or molybdenum disulphide, 12–32% by volume.
Fuorocarbon: Sintered fluorocarbon, 14–32% by volume.
Thermosetting resin:
    21–39% by volume.
    25–35% best range.

To give a general idea of the volume to weight conversion data, the specific gravities of compact bodies of the solids and body of liquid of the components used in the present bearing material are as follows:

|  | Gm./cc. |
|---|---|
| Copper spheres | 8.9 |
| Bronze spheres | 8.9 |
| Lead powder | 11.3 |
| Silver powder | 10.5 |
| Graphite powder | 1.8 |
| Molybdenum disulphide powder | 4.9 |
| Sintered fluorocarbon (PTFE) powder | 2.15 |
| Epoxy (liquid mix) | 1.1 to 1.2 |

It is thus seen that the invention provides an improved bearing material and an improved method of making it.

It avoids metal sintering and thereby preserves the qualities of the fluorocarbon, yet avoids the difficulties in trying to force fluorocarbon into the pores of sintered metal.

It provides a hard body which prevents localization of large bodies of fluorocarbon with consequent creep and yield, yet provides ample distribution and effect of the fluorocarbon.

It has excellent heat conductivity and prevents destructive overheating of the fluorocarbon.

It makes good use of solid lubricants with their well-known desirable qualities.

It is readily made and is homogeneous and uniform in character.

While certain embodiments of the invention have been described for purposes of illustration, it is to be understood that there may be various embodiments and modifications within the general scope of the invention.

I claim:
1. A bearing material comprising: metallic heat-conducting particles selected from the group consisting of bronze, copper, silver, lead in a range of 18% to 52% by volume; a solid lubricant selected from graphite and molybdenum disulphide in a range of 12% to 32% by volume; a sintered fluorocarbon in a range of 14% to 32% by volume; and a thermosetting resin selected from the group consisting of epoxy and polyester in a range of 21% to 39% by volume.

2. A bearing material comprising by volume:
(a) 18% to 52% of a metal selected from the group consisting of copper and bronze particles of a size 0.0001" to 0.004" diameter with a greater proportion of copper when mixed with bronze particles up to 3 to 1;
(b) 12% to 32% of a solid lubricant powder selected from the group consisting of graphite and molybdenum disulphide;
(c) 14% to 32% of sintered fluorocarbon;
(d) 21% to 39% of a thermosetting resin selected from the group consisting of epoxies and polyamides, hardened to bind the components into a hard rigid body.

3. A bearing material as set forth in claim 2, in which powdered lead is included in the amount of 0% to 20% of the total metal content.

4. A bearing material as set forth in claim 2, in which silver powder is included instead of the copper and bronze.

5. A bearing material as set forth in claim 2, in which a substrate is bonded to the material by a thermosetting resin which is strongly adherent to the thermosetting resin of the bearing material.

References Cited

UNITED STATES PATENTS

| | | | |
|---|---|---|---|
| 2,646,380 | 7/1953 | Barlow et al. | 156—245 X |
| 2,691,814 | 10/1954 | Tait | 29—182.5 |
| 2,777,783 | 1/1957 | Welch | 117—75 |
| 2,798,005 | 7/1957 | Love | 117—8 |
| 2,964,476 | 12/1960 | Coad | 252—26 |
| 3,011,219 | 12/1961 | Williams | 156—247 |
| 3,056,709 | 10/1962 | Rising et al. | 156—7 |
| 3,198,691 | 8/1965 | Thomas et al. | 260—837 X |

EARL M. BERGERT, *Primary Examiner.*

H. ANSHER, *Assistant Examiner.*